United States Patent
Chung

(10) Patent No.: US 6,791,925 B1
(45) Date of Patent: Sep. 14, 2004

(54) METHOD AND APPARATUS FOR ADJUSTING REPRODUCTION SPEED OF OPTICAL DISK

(75) Inventor: Sung-Goo Chung, Kyunggi-Do (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 09/665,944

(22) Filed: Sep. 21, 2000

(30) Foreign Application Priority Data

Sep. 21, 1999 (KR) ..... 1999-40588

(51) Int. Cl.$^7$ ..... G11B 7/00
(52) U.S. Cl. ..... 369/53.12; 369/53.17; 369/47.38
(58) Field of Search ..... 369/53.12, 53.13, 369/53.14, 53.15, 53.17, 53.32, 53.11, 47.38

(56) References Cited

U.S. PATENT DOCUMENTS

| | | | | |
|---|---|---|---|---|
| 6,044,052 A | * | 3/2000 | Kubo et al. | 369/50 |
| 6,111,826 A | * | 8/2000 | Minase | 369/50 |
| 6,226,245 B1 | * | 5/2001 | Fueki | 369/50 |

* cited by examiner

Primary Examiner—Nabil Hindi
(74) Attorney, Agent, or Firm—Birch, Stewart, Kolasch & Birch, LLP

(57) ABSTRACT

The present invention relates to an apparatus and method for adjusting the reproduction speed of an optical disk, and more particularly, to a method for adjusting the reproduction speed of an optical disk which is capable of selectively adjusting the reproduction speed to a lower speed in advance only with respect to an abnormal regional section of the optical disk inserted into a driver, and normally reproducing a recording signal on the optical disk at the original high speed with respect to sections excepting for the abnormal regional section. Thus, there is an effect of reproducing data at a high speed even if the state of the optical disk is bad. In addition, a delayed reproduction time delayed can be removed by gradually reducing the reproduction speed of the optical disk.

13 Claims, 5 Drawing Sheets

| NORMAL SPEED RANGE | 24X - 48X(NORMAL) |
|---|---|
| A: FIRST STEP OF ABNORMAL SPEED RANGE | 16X - 40X |
| B: SECOND STEP OF ABNORMAL SPEED RANGE | 12X - 32X |
| C: THIRD STEP OF ABNORMAL SPEED RANGE | 8X - 24X |
| D: FOURTH STEP OF ABNORMAL SPEED RANGE | 4X - 16X |

RAM

| ABNORMAL REGIONAL SECTION | REPRODUCTION SPEED INFORMATION |
|---|---|
| $A_1 - A_2$ | B(12X~32X) |
| $B_1 - B_2$ | B(12X~32X) |
| $C_1 - C_2$ | C(8X~24X) |
| $D_1 - D_2$ | A(16X~40X) |
| $E_1 - E_2$ | D(4X~16X) |
| ⋮ | ⋮ |

FIG. 5

| NORMAL SPEED RANGE | 24X ~ 48X(NORMAL) |
|---|---|
| A:FIRST STEP OF ABNORMAL SPEED RANGE | 16X ~ 40X |
| B:SECOND STEP OF ABNORMAL SPEED RANGE | 12X ~ 32X |
| C:THIRD STEP OF ABNORMAL SPEED RANGE | 8X ~ 24X |
| D:FOURTH STEP OF ABNORMAL SPEED RANGE | 4X ~ 16X |

FIG. 6

RAM

| ABNORMAL REGIONAL SECTION | REPRODUCTION SPEED INFORMATION |
|---|---|
| $A_1 \sim A_2$ | B(12X~32X) |
| $B_1 \sim B_2$ | B(12X~32X) |
| $C_1 \sim C_2$ | C(8X~24X) |
| $D_1 \sim D_2$ | A(16X~40X) |
| $E_1 \sim E_2$ | D(4X~16X) |
| ⋮ | ⋮ |

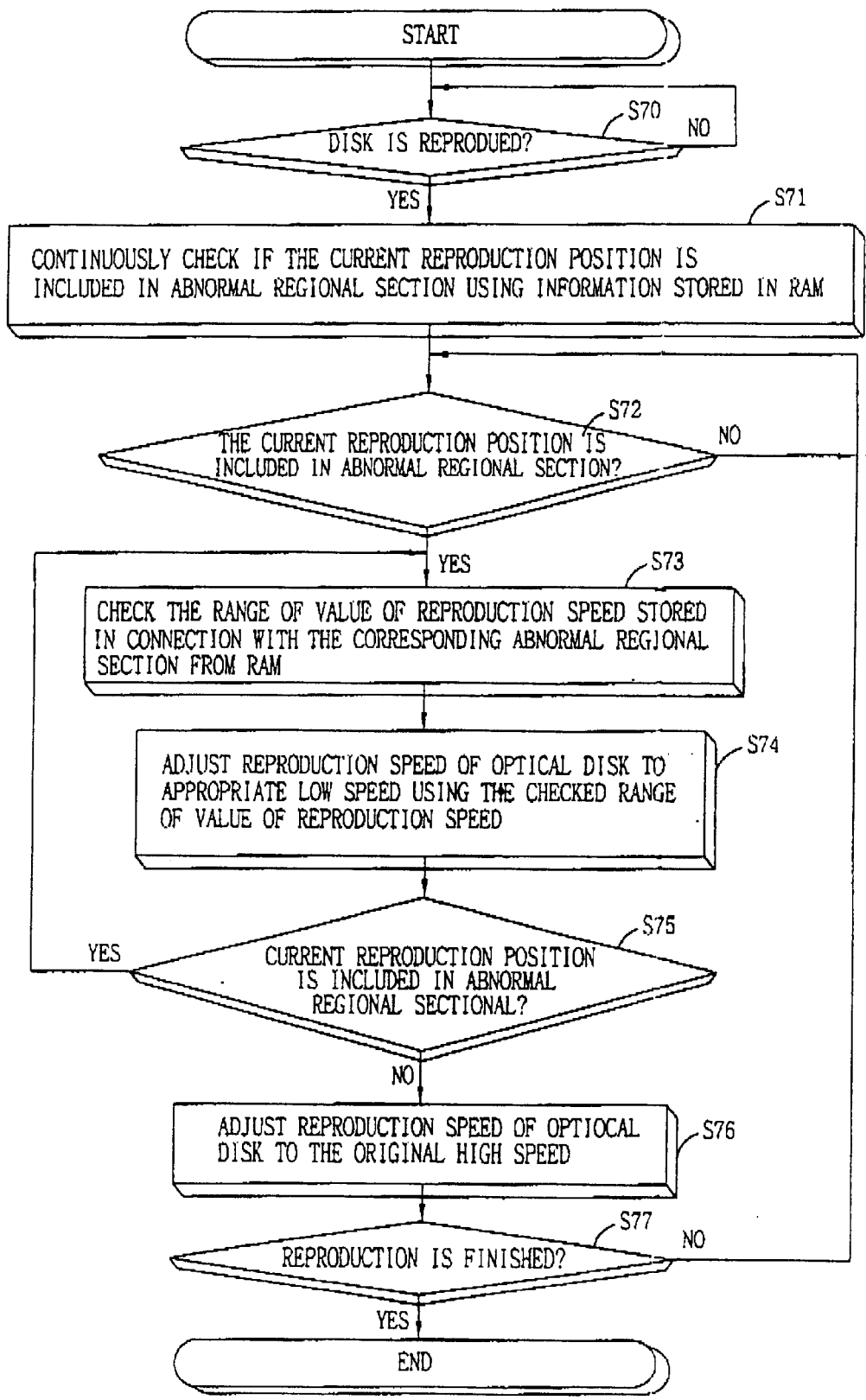

METHOD AND APPARATUS FOR ADJUSTING REPRODUCTION SPEED OF OPTICAL DISK

BACKGROUND OF THE INVENTION

1. Field of the Invention

The present invention relates to an apparatus and method for adjusting the reproduction speed of an optical disk, and more particularly, to an apparatus and method for adjusting the reproduction speed of an optical disk which is capable of selectively adjusting the reproduction speed to a lower speed in advance only with respect to an abnormal regional section of the optical disk inserted into a driver, and normally reproducing a recording signal on-the optical disk at the original high speed with respect to sections excepting for the abnormal regional section.

2. Description of the Background Art

FIG. 1 is a view illustrating the construction of a part of an optical disk reproducing apparatus according to the conventional art. The operation thereof will now be explained with reference to FIG. 2.

FIG. 2 is a graph illustrating the change in running RPM according to an abnormal region of an optical disk.

First, when an optical disk is inserted into a driver, a control unit 16 applies a driving voltage corresponding to a reproduction speed appropriate for the optical disk to a spindle motor M2 through a server 14 and a drive 13, thereby driving the optical disk 10.

Afterwards, a pickup unit 11 outputs a high-frequency reproduction signal reproduced after reading out data from the driven optical disk 10 to a R/F unit 12. The R/F unit 12 performs wave-filtering of the high-frequency reproduction signal, and thereafter outputs the same to a digital signal processing unit 15.

The digital signal processing unit 15 restores the wave filtered signal to a digital bit stream, and thereafter outputs a digital data converted by EFM (Eight to Fourteen Modulation).

Here, when the digital signal processing unit 15 detects an error of data due to drop-out in the above step of restoring the wave filtered signal to a digital bit stream, it produces a specific signal to apply the same to the control unit 16.

Afterwards, an EFM inverter 17 inverts a digital symbol data in unit of 14 bits converted by the EFM to a 8-bit symbol data expected to correspond thereto for thereby outputting the same. At this time, the EFM inverter 17 converts the above data based on EFM table.

Next when the control unit 16 receives a specific signal representing a reproduction error from the digital signal processing unit 15, it controls a CIRC (Cross Interleave Reed-Solomon Code) decoder 18 to execute the process of restoring a reproduced data with an error to a normal data by previously correcting the error of a digital data inputted after being demodulated by the EFM within a predetermined number of times.

Here, in the case that an error data is not restored to the original normal data even if the process of correcting an error is executed within the predetermined number of times, the control unit 16 judges the current reproduction region on the optical disk 10 to be an abnormal region due to scratch, and adjusts the reproduction speed of the optical disk 10 to a lower speed by variably adjusting the driving voltage applied to the spindle motor M2 through the driver 13.

Thereafter, the control unit 16 executes again the process of correcting an error by reading out again a recording data on a corresponding position from the optical disk 10 driven at the lower speed.

In addition, the control unit 16 readjusts the reproduction speed of the optical disk 10 to the higher speed prior to being adjusted to the lower speed within a predetermined time, in a state that the optical disk 10 is driven at the lower speed, and then executes the process of reproducing data.

Here, if an abnormal region is detected from the optical disk 10 a number of times as in FIG. 2 during the execution of the reproduction, and the number of times is more than a predetermined number of times, the control unit 16 fixes the reproduction speed of the optical disk 10 at a low speed, and drives the optical disk 10 at a predetermined low speed until the completion of the reproduction.

However, in the optical disk reproducing method of the conventional art, in the-case that an error data generated when data is reproduced after being read out from the optical disk is not restored to a normal data even if the process of correcting an error is executed as much as a predetermined number of times, since the reproduction speed of the optical disk is gradually adjusted to a lower speed at a corresponding position, there is a problem that the reproduction time is delayed when the optical disk is reproduced.

SUMMARY OF THE INVENTION

Accordingly, it is an object of the present invention to provide an apparatus and method for adjusting the reproduction speed of an optical disk capable of selectively adjusting the reproduction speed to a lower speed in advance only with respect to an abnormal regional section of the optical disk inserted into a driver, and normally reproducing a recording signal on the optical disk at the original high speed with respect to sections excepting for the abnormal regional section.

To achieve the above object, there is provided an apparatus for adjusting the reproduction speed of an optical disk according to the present invention which includes: a driving unit for driving the optical disk; a pickup unit for detecting a reproduction signal from data recorded on the optical disk; a signal processing unit for processing the detected reproduction signal; and a control unit for gradually down-adjusting the reproduction speed of an abnormal section from the position at which a reproduction error signal is generated to the position at which the reproduction error signal is not generated, when the reproduction error signal is generated to the above reproduction signal.

To achieve the above object, there is provided a method for adjusting the reproduction speed of an optical disk according to the present invention which includes the steps of: judging if a reproduction error signal is generated from a signal reproduced from the optical disk; adjusting the reproduction speed of the optical disk from the position at which the reproduction error signal is generated; and consecutively storing the reproduction speed of an abnormal section from the position at which the reproduction error signal is generated to the position at which the reproduction error signal is not generated and the range of the value of the reproduction speed varied in the abnormal section.

To achieve the above object, there is provided a method for adjusting the reproduction speed of an optical disk according to the present invention which includes the steps of: judging if the reproduction position generated from the optical disk corresponds to an abnormal section; adjusting the reproduction speed of the optical disk to a lower speed according to the range of the value of the reproduction speed of the optical disk wherein the reproduction position of the optical disk corresponds to the abnormal section; and adjusting the reproduction speed of the optical disk to a higher speed, if the reproduction speed of the optical disk does not correspond to the abnormal section.

To achieve the above object, there is provided a method for adjusting the reproduction speed of an optical disk according to the present invention which includes the steps of: judging if there is an abnormal region on the optical disk by a reproduction signal reproduced after a recording signal is read out from the optical disk; and consecutively storing information on the reproduction speed appropriate for the abnormal region and the position of the abnormal region, if the abnormal region is occurred on the optical disk in the above judging step.

To achieve the object, there is provided another method for adjusting the reproduction speed of an optical disk according to the present invention which includes the steps of: reading out information on the abnormal regional section of the optical disk and the corresponding reproduction speed, and thereafter checking if the current position of the optical disk is included in the read-out abnormal regional section; and variably adjusting the reproduction speed of the optical disk to a reproduction speed corresponding to the abnormal region.

BRIEF DESCRIPTION OF THE DRAWINGS

The present invention will become better understood with reference to the accompanying drawings which are given only by way of illustration and thus are not limitative of the present invention, wherein:

FIG. 5 is a view illustrating an example of the range of the value by each step with respect to the reproduction speed of an optical disk;

FIG. 6 is a view illustrating an example of the state where the abnormal regional section of an optical disk and information on the reproduction speed corresponding to the section are consecutively stored in a RAM; and FIG. 7 is a flow chart illustrating a method for adjusting the reproduction speed of an optical disk according to another embodiment of the present invention.

DETAILED DESCRIPTION OF THE PREFERRED EMBODIMENTS

Figure 1:
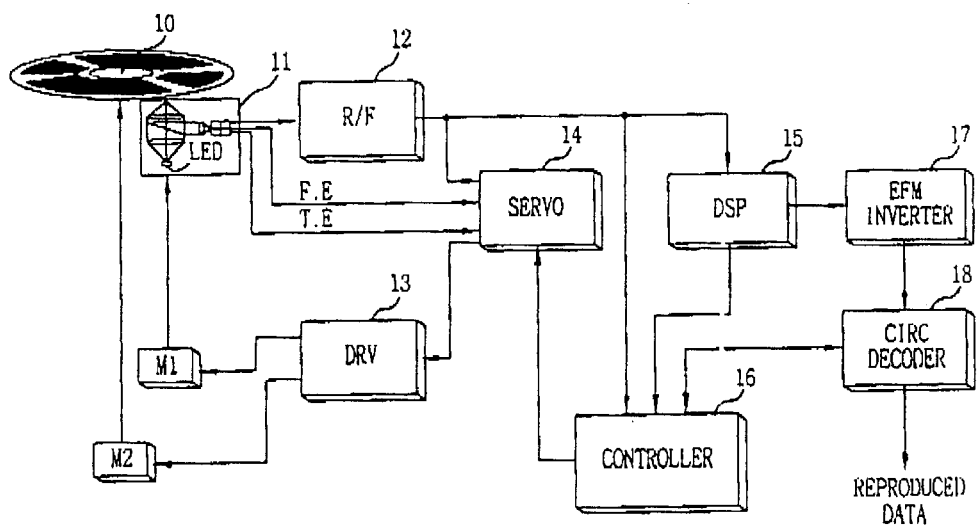
FIG. 1 is a view illustrating the construction of a part of an optical disk reproducing apparatus according to the conventional art.
Figure 2:
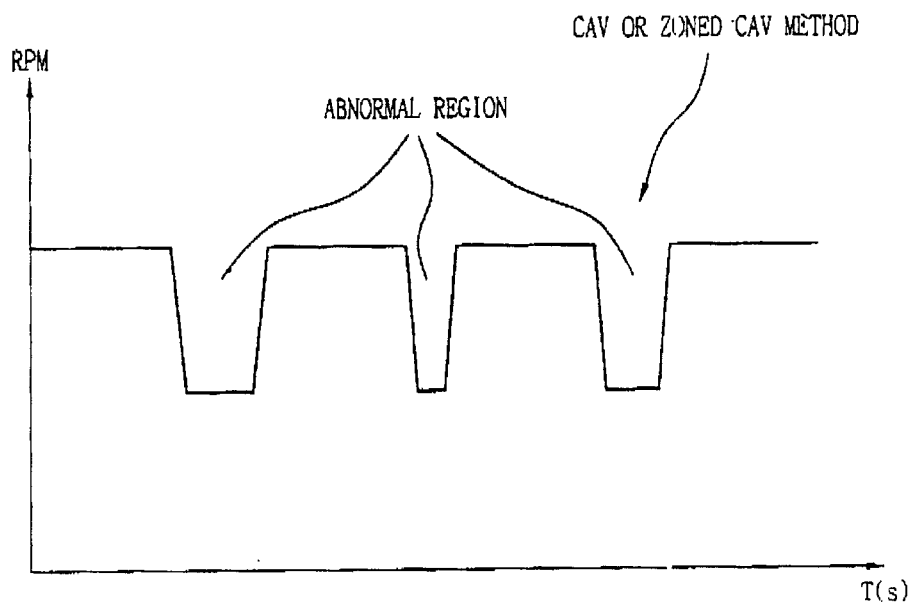
FIG. 2 is a graph illustrating the change in running RPM according to an abnormal region of an optical disk.
Figure 3:
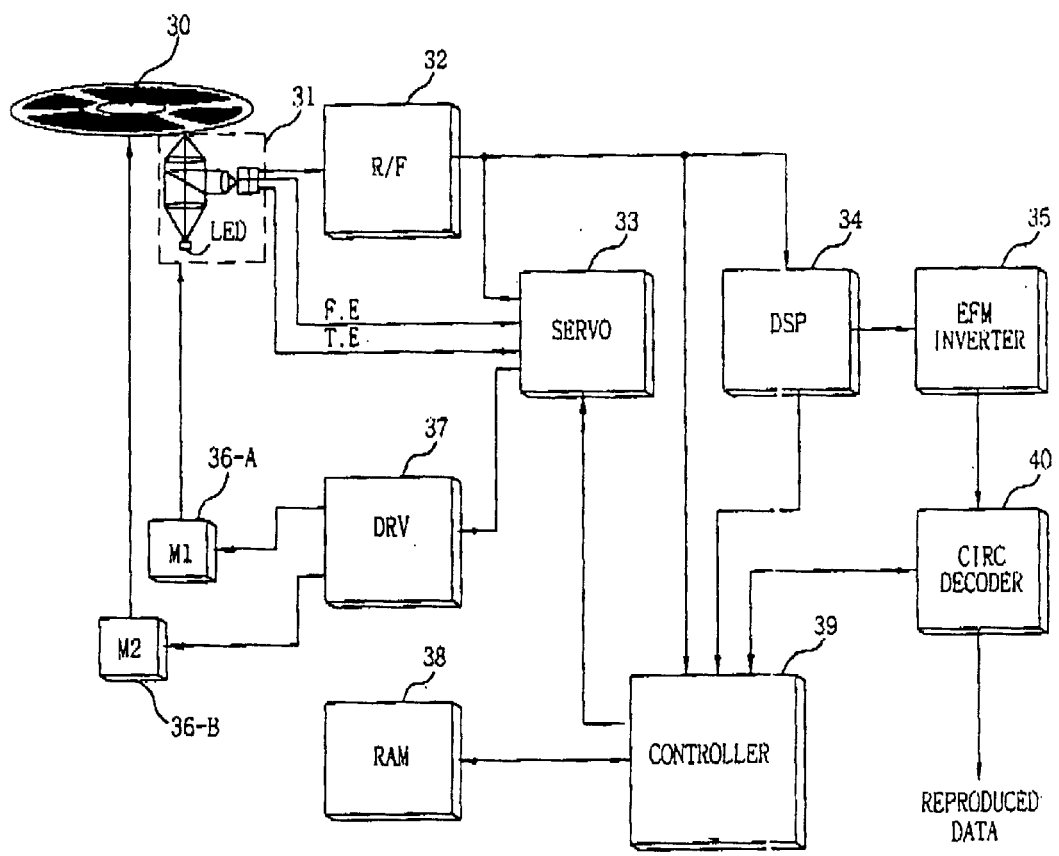
FIG. 3 is a view illustrating the construction of an optical disk to which a method for adjusting the reproduction speed of an optical disk according to the present invention is adapted.

FIG. 3 is a view illustrating the construction of an optical disk to which a method for adjusting the reproduction speed of an optical disk according to the present invention is adapted. The optical disk reproducing apparatus includes: a pickup unit 31 for detecting a RF (Radio Frequency) signal from the surface of the optical disk 30 inserted into a driver; a driver unit 37 for driving motors 36A and 36B for rotating the pickup unit 31 and the optical disk 30, respectively; a R/F unit 32 for wave-filtering the detected RF signal; a server unit 33 for controlling driving of the driver unit 37 using the wave-filtered signal and the rotational speed of the optical disk 10; a digital signal processing unit 34 for restoring the wave-filtered binary signal into a digital bit stream using a clock whose phase is synchronized with the binary signal, and thereafter outputting the same by converting it into a 14-bit EFM data; an EFM(Eight to Fourteen Modulation) inverter 35 for demodulating the 14-bit EFM data to a 8-bit data; a CIRC(Cross Interleave Reed-Solomon Code) decoder 40 for detecting an error of the demodulated 8-bit data in unit of error correction block, and correcting the detected error; a RAM(Random Access Memory) 38 for consecutively storing an abnormal regional section on the optical disk 30 and information on the reproduction speed appropriate for this section; and a control unit 39 for grasping information of the reproduction speed appropriate for the detected abnormal region to store the same in the RAM 38, when the abnormal region is detected from the optical disk 30, and variably adjusting the reproduction speed of the optical disk 30 to a pre-stored value, if the information on the corresponding region is pre-stored in the RAM 38. The operation thereof will be described in detail in FIG. 4.

Figure 4:
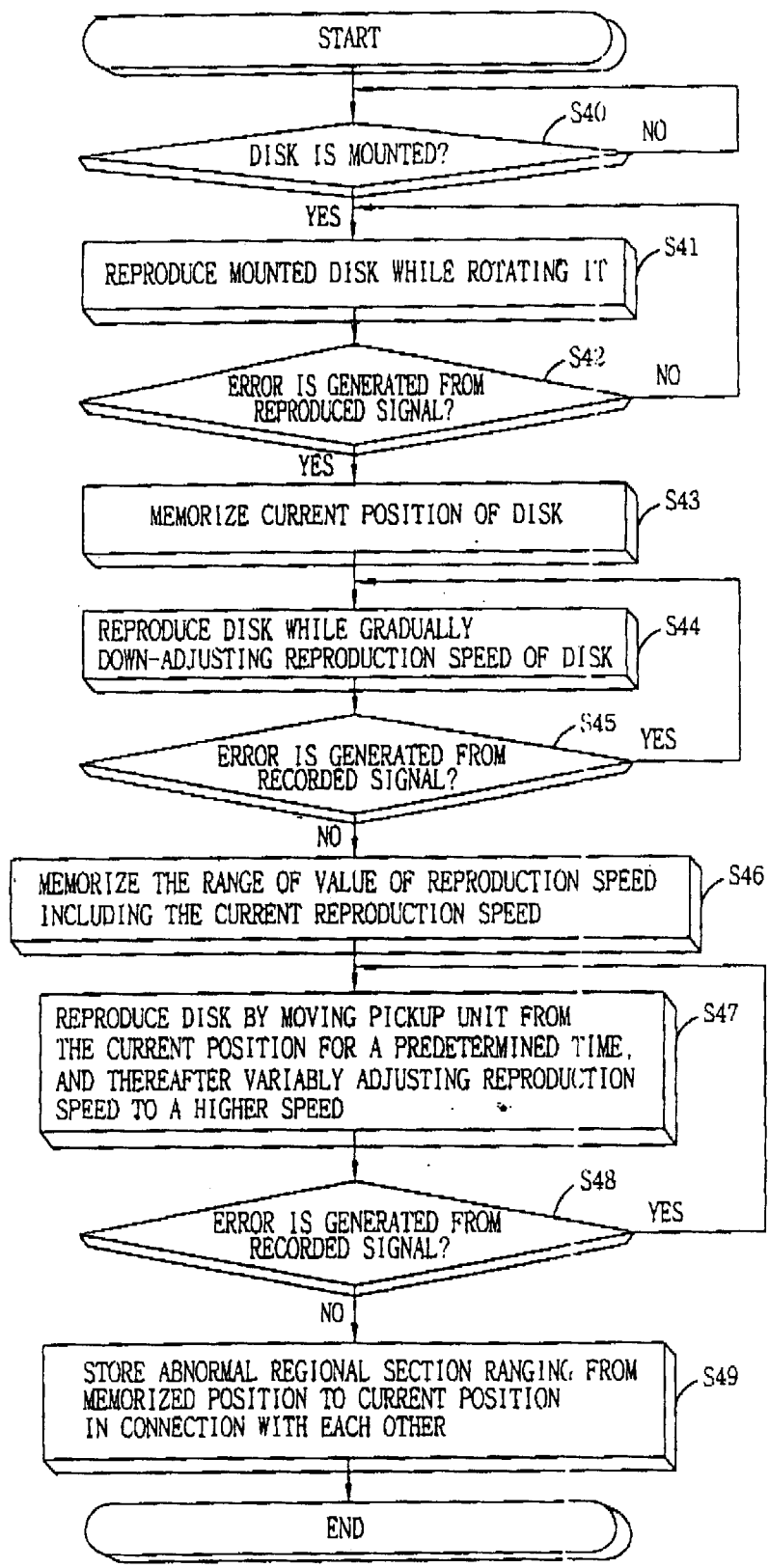
FIG. 4 is a flow chart illustrating a method for adjusting the reproduction speed of an optical disk according to one embodiment of the present invention.

FIG. 4 is a flow chart illustrating a method for adjusting the reproduction speed of an optical disk according to one embodiment of the present invention, which will be described below in detail with reference to FIG. 3.

First, it is judged if the optical disk 30 is mounted on the driver.

If the optical disk 30 is mounted on the driver in the above judging step, the control unit 39 reads out a recording signal (RF signal) on the optical disk 30 and thereafter reproduces the same by driving the optical disk at an appropriate reproduction speed in S41.

Afterwards, the control unit 39 judges if an error is generated from a reproduced signal in the above reproducing step S41 in S42.

If an error is not generated from the reproduced signal in the above judging step S41, the control unit 39 reads out a recording signal (RF signal) on the optical disk 30 to thereafter reproduce the same by driving the optical disk 30 at an appropriate reproduction speed in S41.

Meanwhile, if an error is generated from the reproduced signal in the above judging step S42, the control unit 39 judges the current reproduction position to be an abnormal region, and thus stores the current reproduction position in the RAM 38 in S43.

Afterwards, the reproduction speed of the optical disk 30 is adjusted from a higher speed to a lower speed in S44. In addition, the control unit 39 reads out a recording signal on the optical disk 30, and thereafter executes the process of detecting an error in unit of error correction block and correcting the detected error, if the error is generated from a reproduced reproduction signal.

Here, the reproduction speed of the optical disk 30 is within a predetermined range of the value of the reproduction speed by each step as in FIG. 5.

FIG. 5 is a view illustrating an example of the range of the value by each step with respect to the reproduction speed of an optical disk. In the case that the current reproduction speed is 48×, and the reproduction speed of the optical disk 30 is gradually down-adjusted from a higher speed to a lower speed, the intermediate reproduction speed in the range of the value of the reproduction speed of the optical disk 30 by each step is checked, thus down-adjusting the current reproduction speed from 48× to 24×(A), 16×(B), 12×(C).

Afterwards, the control unit 39 continuously reads out a recording signal on the optical disk 30 to reproduce the same, in a state that the optical disk 30 is driven after the reproduction speed thereof is adjusted to a lower speed (24×). In addition, the control unit 39 checks if an error is generated from a digital data outputted after being restored in the digital signal processing unit 34 in S45.

Next, if an error data is generated in the above step of checking if an error is generated in S45, the control unit 39 controls the CIRC decoder 40 to execute the process of restoring a reproduction data with an error to the original normal data so as to correct the error data within a predetermined number of times.

Here, in the case that the error data is not restored to the original normal data even if the process of correcting an error is executed as much as the predetermined number of times, the control unit 39 down-adjusts the reproduction speed of the optical disk 30 to the next reproduction speed, and thereafter executes again the steps after the above-described step of adjusting the reproduction speed of the optical disk 30.

Thereafter, in a state that the optical disk 30 is driven after the reproduction speed there of is adjusted from a higher speed to a lower speed, the control unit 39 checks if an error is generated from the restored digital data outputted from the digital signal processing unit 34. As the result, if no error data is generated, or an error data is corrected (a reproduction data with an error is restored to the original normal data) by the CIRC decoder 40 within a predetermined number of times, the control unit 39 memorizes the range of the value of the corresponding reproduction speed in which the current, down-adjusted reproduction speed is an intermediate reproduction speed.

For example, if the current low speed at which normal data is detected is 16×, the control unit 39 memorizes the range of the speed to be step B of FIG. 5.

Afterwards, if the pickup unit 31 is moved from the current reproduction position on the optical disk 30 for a predetermined time, the control unit 39 up-adjusts the reproduction speed of the optical disk 30 to a normal reproduction speed (48×) before down-adjustment in S47.

Next, in a state that the optical disk 30 is driven at a reproduction speed up-adjusted to the normal reproduction speed (48×) before the down-adjustment, the control unit 39 judges again if an error is generated from a reproduced signal in S48. In addition, it is checked if an error is corrected when an error data is detected in the step S48 of judging again if an error is generated from a reproduced signal.

If an error data is detected in the step S48 of judging again if an error is generated from a reproduced signal, the step S47 of up-adjusting the reproduction speed of the optical disk 30 to a normal reproduction speed (48×) before down-adjustment is executed again.

Meanwhile, if an error is not generated, or if an error is generated, but is restored to the original normal data, the control unit 39 judges the current, moved reproduction signal to be a normal region deviated from the abnormal region, and confirms a section ranging from the previously memorized position on the optical disk 30 to the current reproduction signal to be an abnormal section. In addition, the confirmed abnormal regional section and the memorized range of the value of the reproduction speed (step B: 12×~32×) are consecutively stored in the RAM 38 in S49.

Here, if the current, moved reproduction position is still judged to be an abnormal region, the control unit 39 executes again the step of confirming an abnormal region as described above, based on a reproducing signal detected from the position moved after low speed reproduction for a predetermined time.

FIG. 6 is a view illustrating an example of the state where the abnormal regional section of an optical disk and information on the reproduction speed corresponding to the section are consecutively stored in a RAM, which will be described with reference to a detailed description of FIG. 7.

FIG. 7 is a flow chart illustrating a method for adjusting the reproduction speed of an optical disk according to another embodiment of the present invention. That is, a method for reproducing the optical disk 30 using information stored in the RAM 38, in a state that the abnormal section of the optical disk 30 and the corresponding reproduction speed information are consecutively stored as in FIG. 6, or are being stored, the method for reproducing the optical disk 30 using information stored in the RAM 38 will be described in detail with reference to FIGS. 3, 5, and 6.

First, it is judged if the optical disk 30 is being reproduced in S70.

In the above judging step S70, if the optical disk 30 is being reproduced, the control unit 39 continuously checks if the current reproduction position corresponds to the confirmed abnormal regional section by comparing the position information on the abnormal regional section stored in the RAM with the information on the current position of the optical disk 30 in S71.

Afterwards, it is checked if the current reproduction position corresponds to the abnormal regional section in S72.

In the above judging step S72, if the current reproduction position is not included in the abnormal regional section, it is continuously checked if the current reproduction position corresponds to the abnormal regional section.

Meanwhile, in the above judging step S72, if the current reproduction position corresponds to the abnormal regional section (e.g., section $D_1 \sim D_2$), the control unit 39 checks the section $D_1 \sim D_2$ and the range of the value of the reproduction speed consecutively being stored from the information in the RAM 38 in S73.

Afterwards, the control unit 39 drives the optical disk 30 by adjusting the reproduction speed of the optical disk 30 to an appropriate lower speed using the confirmed range of the value of the reproduction speed (step A: 16×~40×) in S74. In other words, the optical disk 30 is driven by adjusting the reproduction speed of the optical disk 30 using the confirmed range of the value of the reproduction speed, thereby adjusting the reproduction speed in advance even if an reproduction error is not detected from the optical disk 30.

Afterwards, the control unit 39 continuously judges if the current reproduction speed of the optical disk 30 corresponds to the section $D_1 \sim D_2$ confirmed from the RAM 38 even while executing the above reproduction operation in S75.

In the above judging step S75, if the current reproduction position corresponds to the abnormal regional section $D_1 \sim D_2$, the step S73 of checking the range of the value of the reproduction speed and the section $D_1 \sim D_2$ consecutively stored from the information in the RAM 38 is executed again.

Meanwhile, in the above judging step S75, if the current reproduction position is not included in the abnormal regional section, being deviated from the position $O_2$, the control unit 39 drives the optical disk 30 by readjusting the reproduction speed of the optical disk 30 to the original normal speed (high speed) before being adjusted to a lower speed in S76. That is, a normal region of the optical disk 30 is always reproduced at a high speed.

Afterwards, the step S72 of judging if the current reproduction position corresponds to the abnormal regional section until the reproduction of the optical disk 30 is finished is continuously executed in S80.

As described above, in the present invention, the abnormal regional section of the optical disk mounted on the driver and information on the reproduction speed appropriate for this section are previously detected, and stored, and the reproduction speed of the optical disk is previously adjusted using information on the reproduction speed, thereby removing a reproduction time delayed according to the execution of gradual reduction in reproduction speed.

In addition, there is an effect of reproducing data at a high speed even if the state of the optical disk is bad, by previously grasping the abnormal regional section of the optical disk, and normally driving the optical disk always at the original high reproduction speed in sections excepting for the abnormal regional section.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for reproducing data recorded onto an optical recording/reproducing medium, comprising:

reproducing a signal on the recording/reproducing medium at a first speed;

determining whether an error signal is detected on the reproduced signal;

down-adjusting the reproduction speed lower than the first speed according to the result of the determining step;

reproducing recorded data at the down-adjusted reproduction speed during a predetermined period from a position where the error signal is detected; and storing position information identifying an abnormal section having the predetermined period associated with the down-adjusted reproduction speed information.

2. The method of claim 1, wherein the appropriate reproduction speed is a reproduction speed adjusted at the time when no error signal is generated by gradually down-adjusting the reproduction speed.

3. A method for reproducing data recorded onto an optical recording/reproducing medium, comprising:

determining whether a predetermined reproduction position on the optical recording/reproducing medium corresponds to a previously stored abnormal section associated with down-adjusted reproduction speed information;

checking pre-stored information on an appropriate reproduction speed identifying the abnormal section based on the result of the determining step;

adjusting a current reproduction speed to the speed pre-stored and associated with the pre-stored down-adjusted reproduction speed based on the determining and checking results; and storing position information identifying the abnormal section having the predetermined period associated with the down-adjusted reproduction speed, information.

4. The method of claim 1, further comprising:

reading out and reproducing a recording signal on the optical disk by driving the optical disk at an appropriate reproducing speed if the error signal is not detected.

5. An apparatus for adjusting a reproduction speed of an optical disk, comprising:

a driving unit for driving the optical disk;

a pickup unit for detecting a reproduction signal from data recorded on the optical disk;

a signal processing unit for processing the detected reproduction signal;

a control unit for gradually down-adjusting the reproduction speed of an abnormal section on the optical disk from a first speed to a second lower speed, when the reproduction error signal is generated to the above reproduction signal; and a storage unit for storing position information identifying the abnormal section having the predetermined period associated with the down-adjusted reproduction speed information.

6. The apparatus of claim 5, wherein the control unit adjusts the reproduction speed of the optical disk to a pre-stored value if information on the abnormal section is pre-stored in the storage unit.

7. A method for adjusting the reproduction speed of an optical disk, comprising:

receiving a reproduction error signal which is generated from a signal reproduced from the optical disk;

down-adjusting the reproduction speed of the optical disk from a first speed to a second lower when an error signal is detected;

reproducing recorded data at the down-adjusted reproduction speed during a predetermined period from a position where the error signal is detected; and consecutively storing position information identifying an abnormal section having the predetermined period associated with the down-adjusted reproduction speed information.

8. A method for adjusting the reproduction speed of an optical disk, comprising:

determining whether a reproduction position generated from the optical disk corresponds to an abnormal section;

adjusting the reproduction speed of the optical disk from a first speed to a second lower speed when an error signal is detected;

reproducing recorded data at the down-adjusted reproduction speed during a predetermined period from a position where the error signal is detected;

storing position information identifying an abnormal section having the predetermined period associated with the down-adjusted reproduction speed information; and adjusting the reproduction speed of the optical disk to a higher speed, if the reproduction speed of the optical disk does not correspond to the abnormal section.

9. A method for adjusting the reproduction speed of an optical disk, comprising:

determining whether there is an abnormal region on the optical disk by a reproduction signal reproduced after a recording signal is read out from the optical disk;

down-adjusting the reproduction speed of the abnormal section from a first speed to a second lower speed when an error signal detected;

reproducing recorded data at the down-adjusted reproduction speed during a predetermined period from a position where the error signal is detected; and consecutively storing position information identifying an abnormal section having the predetermined period associated with the down-adjusted reproduction speed information.

10. A method for adjusting the reproduction speed of an optical disk, comprising:

reading out stored information on an abnormal section of the optical disk and a corresponding reproduction speed by determining a current reproduction location;

checking pre-stored information identifying an abnormal section associated with down-adjusted reproduction speed information to determine whether the current position of the optical disk is included in the read-out abnormal regional section;

variably down-adjusting the reproduction speed of the optical disk to the speed pre-stored and associated with the pre-stored down-adjusted reproduction speed based on the result of the checking step; and storing a reproduction position with the down-adjusted reproduction speed, where the error signal is detected.

11. The method for claim 1, wherein the step for storing the reproduction position is a step for storing a reproduction section where the error signal is detected.

12. A method for reproducing data recorded onto an optical medium, comprising:

down-adjusting a current reproduction speed to a speed lower than the current reproduction speed when an error signal is detected;

reproducing recorded data at the down-adjusted reproduction speed during a predetermined period from a position where the error signal is detected; and storing position information identifying an abnormal section having the predetermined period associated with the down-adjusted reproduction speed information.

13. A method for reproducing data recorded onto an optical medium, comprising:

determining a current reproduction location;

checking pre-stored information identifying an abnormal section associated with down-adjusted reproduction speed information; and adjusting a current reproduction speed to a speed pre-stored and associated with the pre-stored, down-adjusted reproduction speed information based on the determining and checking results.

* * * * *